Nov. 24, 1964
R. L. WHITMORE
3,158,056
STAMP AND TAPE DISPENSER
Filed July 5, 1961
3 Sheets-Sheet 1
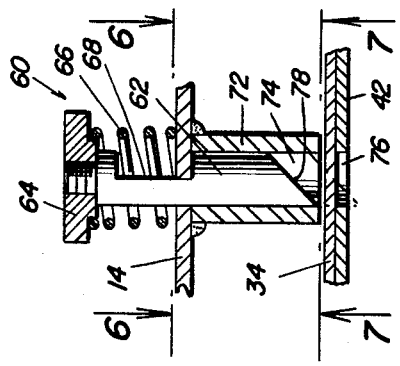
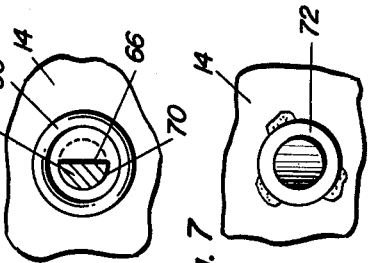
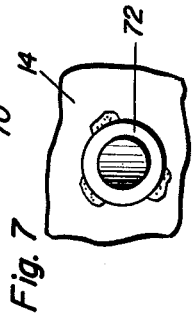
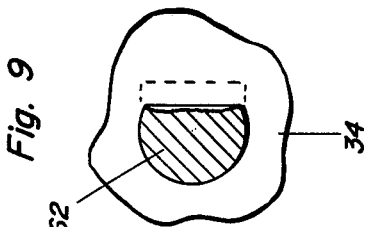
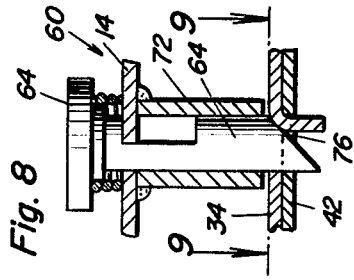
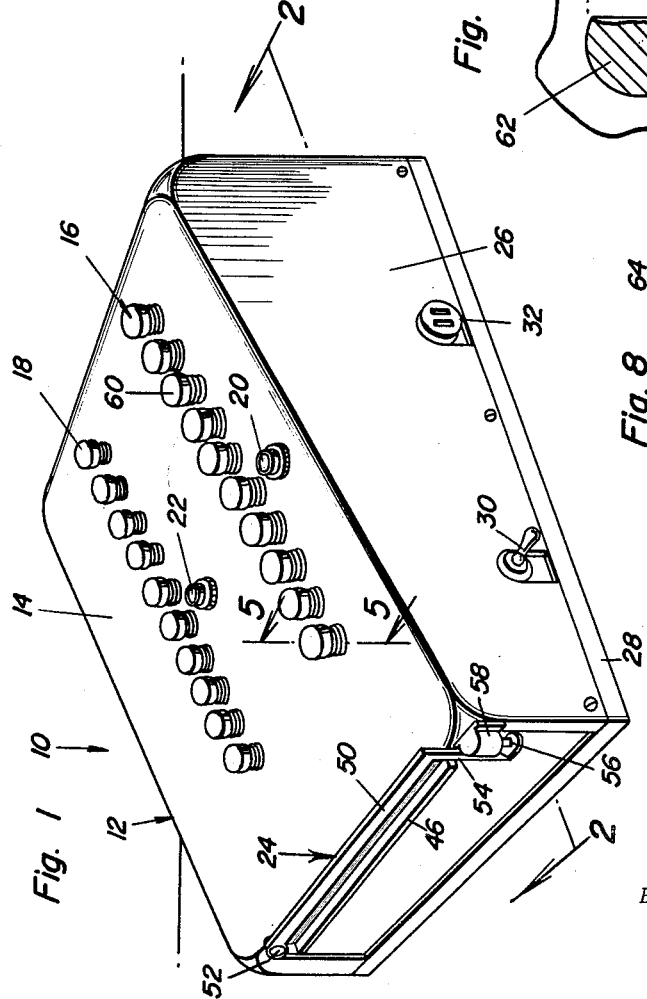
Richard L. Whitmore
INVENTOR.
BY *Clarence A. O'Brien*
and *Harvey B. Jacobson*
Attorneys

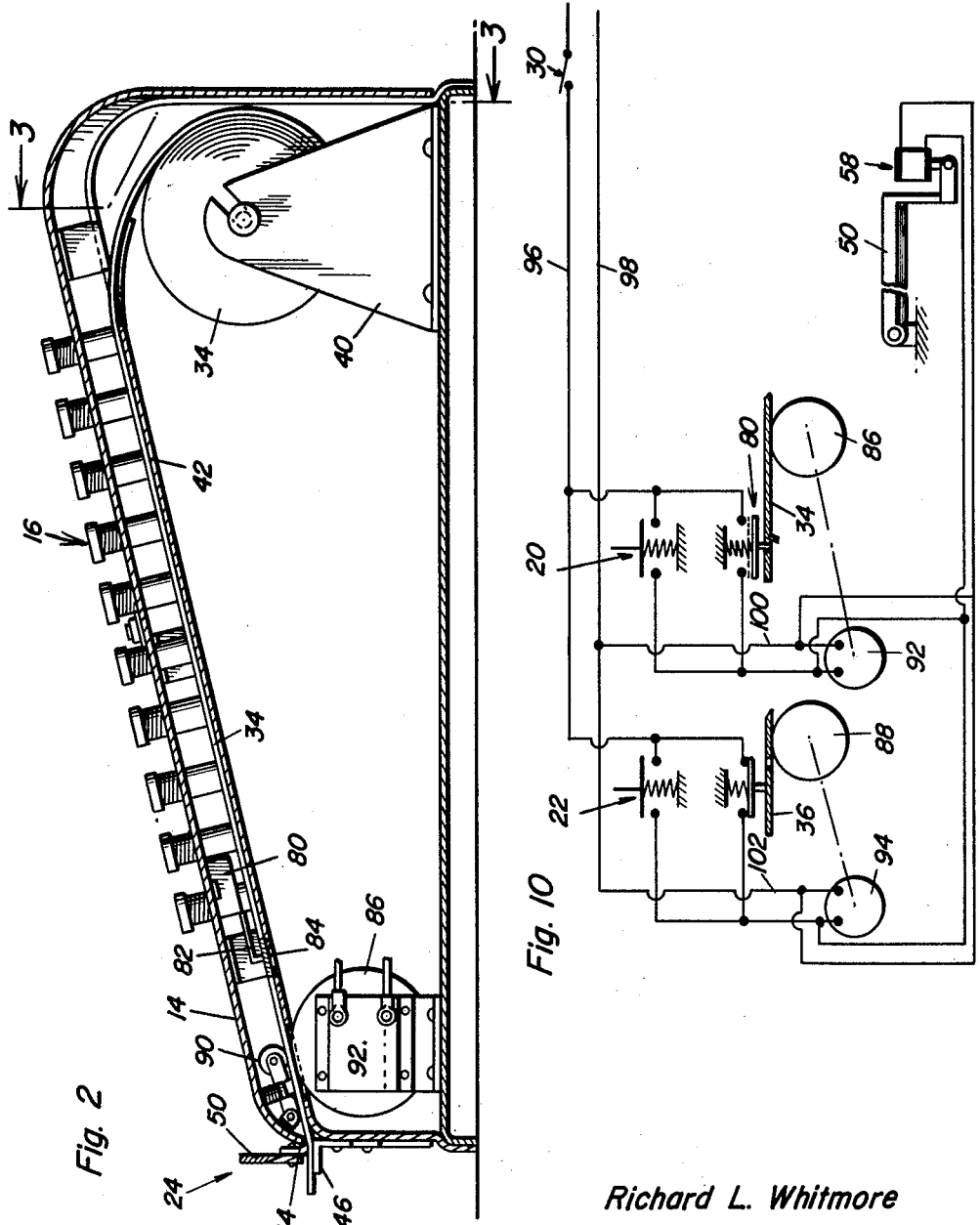

Nov. 24, 1964  R. L. WHITMORE  3,158,056
STAMP AND TAPE DISPENSER
Filed July 5, 1961  3 Sheets-Sheet 3
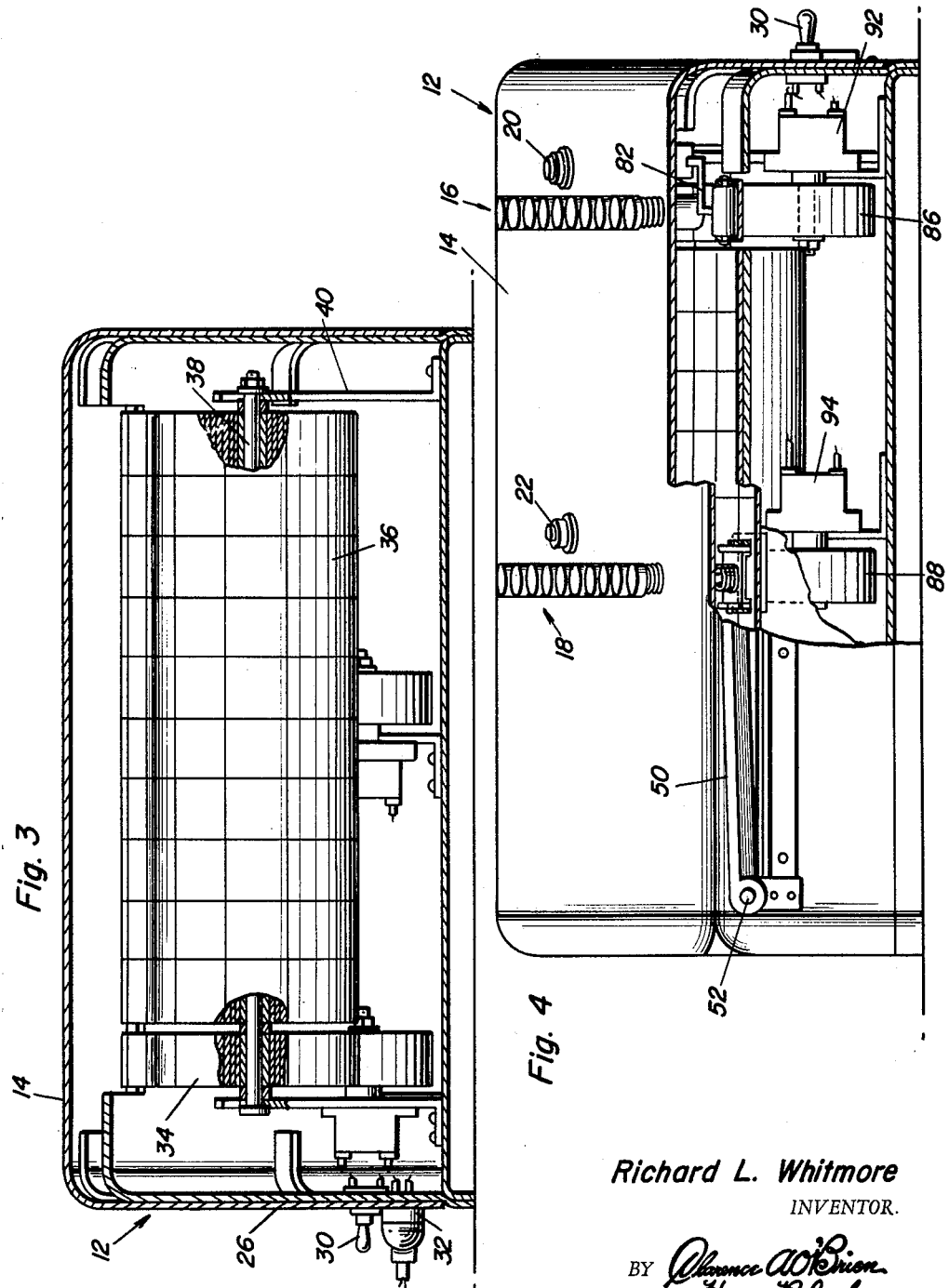
Richard L. Whitmore
INVENTOR.
BY *Clarence A. O'Brien*
and *Harvey B. Jacobson*
Attorneys United States Patent Office 3,158,056
Patented Nov. 24, 1964

3,158,056
STAMP AND TAPE DISPENSER
Richard L. Whitmore, P.O. Box 616, Kenbridge, Va.
Filed July 5, 1961, Ser. No. 121,862
16 Claims. (Cl. 83—210)

This invention relates to a new and useful machine for dispensing predetermined lengths of tape or stamps.

A primary object of the present invention is to provide a tape dispensing machine designed to more rapidly and accurately dispense preselected lengths of tapes, trading stamps or postage stamps or the like.

Another object of the present invention is to provide a tape dispensing machine capable of more accurately dispensing preset lengths of tape by not relying on the skill of the machine operator.

An additional object of the present invention is to provide a tape dispensing machine which is simple in construction and operation and yet operative in a more rapid, accurate and reliable manner.

The tape dispensing machine of the present invention may be mounted by a housing in which a plurality of different widths of tape rolls may be stored with mechanism for independently feeding the different widths of tape from the supply rolls to a cut-off edge by passing of the tape over a tape supporting bed. The tape supporting beds are provided with a plurality of spaced apertures disposed in spaced relation to the cut-off edge of the machine. Aligned with each of the apertures, are tape marking members which when actuated, puncture the tape at a predetermined distance from the cut-off edge. The feeding mechanism which includes an electric motor driven friction wheel in gripping engagement with the tapes are energized in order to feed a preset length of tape toward the cut-off edge when a momentary starting switch is actuated. Feeler switches which hold the power circuit to the feeding motor open, are therefore closed when the tape is displaced upon closing of the starter switches so as to move a punctured aperture in the tape out of alignment with the feeler switches. Accordingly, the feeding motors remain energized for feeding of the tape until the feeler switches are once again aligned with another puncture in the tape which had been made by depression of a selected punching key member. Accordingly, the feeding mechanisms feed a length of tape corresponding to the depression of the selected key punching member. Each of the tapes may thereby be fed a preset distance. All of the tapes may then be cut off by a common cutting blade actuated by a solenoid.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a tape dispensing machine made in accordance with the present invention.

FIGURE 2 is a sectional view taken substantially through a plane indicated by section line 2—2 in FIGURE 1.

FIGURE 3 is a sectional view taken substantially through a plane indicated by section line 3—3 in FIGURE 2.

FIGURE 4 is a front elevational view of the tape dispensing machine with parts broken away and shown in section.

FIGURE 5 is a partial sectional view taken substantially through a plane indicated by section line 5—5 in FIGURE 1.

FIGURE 6 is a partial sectional view taken through a plane indicated by section line 6—6 in FIGURE 5.

FIGURE 7 is a partial sectional view taken through a plane indicated by section line 7—7 in FIGURE 5.

FIGURE 8 is a sectional view similar to that of FIGURE 5 illustrating the selector key punching member in a depressed condition.

FIGURE 9 is a partial sectional view taken through a plane indicated by section line 9—9 in FIGURE 8.

FIGURE 10 is a circuit diagram of the control circuit of the tape dispensing machine.

Referring now to the drawings in detail, it will be observed from FIGURE 1, that the tape dispensing machine is generally referred to by reference numeral 10 and includes a machine housing 12 of any suitable design mounted on a base 28. The housing 12 includes a top face portion 14 mounting two rows of selector key members 16 and 18. The starter switch buttons 20 and 22 are also mounted on the top face portion 14, which starter switch buttons are respectively associated with the selector key rows 16 and 18. Mounted at the forward end of the machine housing 12 is the stamp cut-off mechanism generally referred to by reference numeral 24. One of the sides 26 of the machine housing 12 may therefore mount an on-off switch 30 for the machine and a plug-in receptacle 32 by means of which an electrical power connection may be made.

Referring now to FIGURES 2, 3 and 4, it will be observed that the row 16 of selector key members controls the dispensing of a single row of tape from a single supply roll 34. The row 18 of selector key members on the other hand, controls the dispensing of a ten row wide tape from the supply rolls 36. Both of the tape rolls 34 and 36 are mounted on a supporting shaft member 38 removably mounted between the supporting bracket 40 housed within the housing 12 adjacent the rear portion thereof. Each of the tape rolls 34 and 36 are dispensed independently of each other except for the cut-off thereof, by similar feeding and control mechanism.

The tape from the supply roll 34 for example, extends over a tape supporting bed 42 and passes out of a dispensing slot 44 at the forward end of the housing and rests upon a cut-off ledge 46 connected to the forward end of the housing. The wider tape from the roll 36 similarly extends over a tape supporting bed member and extends through the slot 44 and over the cut-off supporting ledge 46. Cut-off of both the tapes from the rolls 34 and 36 may therefore be effected by the cut-off mechanism 24 which includes an elongated cutting blade member 50 pivotally mounted by pivot 52 at one side of the machine opposite the side 26. An actuating arm 54 is connected to the other end of the cut-off blade member 50, which arm is connected to plunger 56 of a power operated solenoid mechanism 58. Energization of the solenoid mechanism 58 as hereafter described, raises the blade which is pivotally lowered upon deenergization toward the cut-off ledge 46 in order to sever the tape extending out of the discharge slot 44.

It will be appreciated, that the key members in each of the rows 16 and 18 may be depressed in order to select the desired length of tape to be dispensed by the machine. Referring therefore to FIGURES 5 through 9 in particular, it will be observed that each of the key members is slidably mounted in the top portion of the housing. The key member which is generally referred to by reference numeral 60 includes a shank portion 62 and a head portion 64 connected thereto. A spring member 66 is disposed about the shank portion 62 between the head portion 64 and the portion 14 of the housing in order to bias the key member to its upper position as illustrated in FIGURE 5. A keying slot 68 is therefore formed in the shank portion 62 in order to prevent rotation of the key member 60 within the semi-circular aperture 70 formed in the housing portion 14 for slidably receiving the key member. Also, the slot 68 limits the axial movement of the member in both directions. Slidably mounting the key member shank 62 below the housing portion 14 is a tubular guide element 72 that is secured to the housing portion 14 as by welding. The bore 74 of the guide element 72 is in alignment with one of a plurality of apertures 76 formed in the tape supporting bed member 42. The lower end of the key member shank portion 62 is beveled as at 78 forming a puncturing edge. Accordingly, when the key member 60 is depressed against the bias of the spring 66, a semi-circular aperture is punctured in the tape 34 with a flap folded downwardly by the bevel surface 78 along the rear edge of the aperture as more clearly shown in FIGURE 8. It will therefore be apparent, that by providing suitable indicia on the head portion 64 of the key member 60, the depression of a selected key member on either of the rows 16 or 18, will puncture the tape on the top supporting bed 42 at a predetermined distance from the dispensing ledge 46 at which the tape is finally severed.

Mounted adjacent the forward end of the machine but spaced therefrom, is a feeler switch mechanism 80 which is mounted below the portion 14 of the housing and includes a feeler switch arm 82 the end of which is in alignment with an aperture 84 in the tape supporting bed 42 over which the tape extends. It will therefore be apparent, that when the punctured aperture in the tape is aligned with the aperture 84 in the tape supporting bed, the feeler switch arm 82 will fall downwardly into the aperture 84. When, however, the tape is fed along the tape supporting bed 42 by a limited amount bringing the punctured aperture thereof out of alignment with the aperture 84 and the feeler switch arm 82, the feeler switch arm 82 will be displaced upwardly by the flap edge of the aperture. Feeding of the tape toward the cut-off ledge 46 is effected by means of frictional feeding disk members 86 and 88 that respectively engage the tape 34 and 36 through slots at the lower end of the tap supporting bed 42. The tape is maintained in frictional engagement with the friction feeding disk by means of spring pressed wheels 90 pivotally mounted on the housing. Each of the feeding disks 86 and 88 is therefore provided with an electric motor 92 and 94 of the self-braking type so that when the motor is deenergized it is automatically braked, the brake mechanism being released when the motor is energized to rotate the feeding disk for feeding of the tapes. The feeding motors 92 and 94 are respectively controlled by depression of the starting switch buttons 20 and 22. Stopping and starting of the feeding motors is further controlled by the feeler switch mechanism 80 which is associated with each of the feeding motors.

Referring therefore to FIGURE 10, the control circuit for operation of the tape dispensing machine will be seen. Supply power lines 96 and 98 are connected through the receptacle 32 to a supply of electrical power. The on-off switch 30 is therefore connected to the line 96. Line 98 on the other hand is connected by parallel branches 100 and 102 to one of the terminals of the feeding motors 92 and 94. The other terminals of the motors 92 and 94 are selectively connected through the feeler switch mechanism 80 to the power line 96 in order to complete a power circuit through the motors 92 and 94. The blade operating solenoid 58 is also electrically connected in parallel to both motor circuits whereby severing of all the tapes is prevented until feeding of the last tape has stopped. Accordingly, when the feeler switch mechanisms are out of alignment with a puncture in the tape the motor controlled thereby will be energized in order to continuously feed the tape by rotation of the feeding disks 86 and 88 and also energize the solenoid 58 to hold the cut-off blade 50 in its upper position. Movement of the tapes 34 and 36 will therefore be affected until both feeler switches have become aligned with punctures to open both switches and the power circuits to both motors whereupon the solenoid 58 is deenergized. Accordingly, only when feeding by the last motor stops, both tapes are severed. Should it be desired to start feeding once again, the starting switch 20 or 22 is depressed in order to close a parallel circuit by-passing the open feeler switch in order to feed the tape a sufficient distance so as to bring the puncture out of alignment with the feeler switch whereupon the feeler switch closes to thereafter continuously energize the feeding motor associated therewith until another puncture is aligned with and opens a feeler switch which puncture has been effected by depression of a selected key member 60. Accordingly, the length of tape fed by the feeding mechanism will depend upon the distance of the puncture from the feeler switch mechanism. From the foregoing description, operation and utility of the tape dispensing machine will be apparent. In order to dispense a desired quantity of stamps that may be formed on the tape, the operator need only to press a selected key member 60 in the row 16 and a selected key member in the row 18 thereby puncturing at the desired location both the tapes 34 and 36. Depression of the starter buttons 20 and 22 will thereby initiate feeding of the tapes 34 and 36 independently of each with the feeding stopping after the predetermined length of tape has been fed. It will therefore be appreciated, that the dispensing of a tape by the machine of the present invention may be effected rapidly and requires very little skill on the part of the operator. Furthermore the accuracy with which the desired length of tape is dispensed, does not depend upon the skill of the operator and will be uniform and reliable. Furthermore, operation of the machine is rendered simply by avoiding the use of levers requiring manual manipulation to a selected setting. Also, the mechanism involved is relatively simple and hence reliable in operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for dispensing a continuous sheet of unmarked stamps or the like comprising, housing means, supply means mounted in the housing means, cut-off means mounted on the housing means spaced from the supply means, supporting bed means mounted in the housing means for supporting said continuous sheet between the supply means and cut-off means, feeding means engageable with the continuous sheet and rendered operative for continuous feeding of the sheet toward the cut-off means, selectively operable physically marking means for marking the continuous sheet at a selected position on the supporting bed means, mark sensing means continuously disposed in operative contact with said continuous sheet in spaced relation to the selectively operable marking means to deenergize the feeding means in response to sensing of a mark on the sheet, and start means operatively connected to the feeding means for displacement of the continuous sheet by a limited amount to move the mark out of alignment with the sensing means rendering the feeding means continuously operative until another mark becomes aligned with the sensing means.

2. The combination of claim 1, wherein the selectively operable marking means comprises a plurality of puncturing key members respectively aligned with apertures in the supporting bed means at different predetermined distances from the sensing means for punching apertures in the continuous sheet.

3. The combination of claim 2, wherein the supply means includes rolls of tape of different width independently marked by the selectively operable marking means, independently fed by the feeding means and simultaneously severed by the cut-off means.

4. The combination of claim 1, wherein the supply means includes rolls of tape of different width independently marked by the selectively operable marking means, independently fed by the feeding means and simultaneously severed by the cut-off means.

5. Apparatus for dispensing unmarked stamps or the like comprising, housing means, tape supply means mounted in the housing means, stamp cut-off means mounted on the housing means spaced from the supply means, tape supporting bed means mounted in the housing means for supporting tape between the supply means and the cut-off means, tape feeding means rendered operative for continuously feeding the tape toward the cut-off means, selectively operable tape puncturing means for forming an aperture in the tape at different selected positions on the support bed means, and control means responsive to one of said apertures in the tape and operatively connected to the feeding means and the cut-off means for sequentially feeding and severing a length of tape preselected by the selectively operable tape puncturing means.

6. The combination of claim 5, wherein said control means comprises electrical power circuit means operatively connected to the feeding means for energization thereof, aperture sensing means connected to the circuit means for opening thereof in response to sensing of a puncture in the tape, and momentary starting switch means connected to the circuit means in parallel with the aperture sensing means for momentarily energizing the feeding means to displace the tape by a limited amount sufficient to render the feeding means continuously operative until another puncture in the tape is sensed by the feeler switch means.

7. The combination of claim 6, wherein said cut-off means comprises a cutting blade mounted on the housing means, solenoid operating means connected to the blade and switch control means operatively connecting the solenoid operating means to the power circuit means.

8. In a dispenser for a continuous tape, frictional feed means rendered operative to continuously feed said tape, selectively operated marking means for producing punctures at different selected space locations on the tape, puncture sensing means operatively connected to said frictional feed means for rendering the feed means inoperative in response to sensing of a puncture, and start means for rendering said feed means operative in response to limited movement of said puncture out of alignment with said sensing means.

9. Apparatus for dispensing a plurality of tapes comprising, housing means, tape supply means mounted in the housing means, a single cut-off device mounted on the housing means spaced from the supply means, tape supporting bed means mounted in the housing means for supporting said tapes between the supply means and the cut-off device, tape feeding means engageable with the tapes for continuous feeding thereof toward the cut-off device selectively operable tape marking means for physically marking the tapes at different selected positions thereon, mark detection means disposed in continuous operative relation to the tapes and in spaced relation to the selectively operable means to deenergize the feeding means in response to detection of marks on the tapes, and means responsive to deenergization of the last feeding means to actuate the cut-off device for simultaneously severing all the tapes.

10. The combination of claim 9 wherein the selectively operable means comprises a plurality of tape puncturing key members respectively aligned with apertures in the tape supporting bed means at different predetermined distances from the detection means for producing apertures with depending flaps to physically mark the tapes.

11. The combination of claim 10 including start means operatively connected to the feeding means for limited displacement of selected tapes and marks thereon out of alignment with the detection means to render said feeding means operative to continuously feed said selected tapes and condition said cut-off means for subsequent operation.

12. The combination of claim 9 including start means operatively connected to the feeding means for limited displacement of selected tapes and marks thereon out of alignment with the detection means to render said feeding means operatively to continuously feed said selected tapes and condition said cut-off means for subsequent operation.

13. Apparatus for dispensing a plurality of tapes comprising, a plurality of feeding devices respectively engageable with said plurality of tapes for individual feeding thereof toward a cut-off station, a single cutter blade operative to simultaneously sever all of said tapes at the cut-off station, a plurality of marking devices associated with each of said tapes for physically marking the tapes at different preselected distances from the cut-off station, sensing means operatively positioning relative to said tapes for sensing marks produced thereon to stop feeding of the tapes when the marks thereon are spaced a predetermined distance from the cut-off station, selectively controlled starting means operatively connected to said feeding devices for effecting limited movement of the tapes individually to displace the marks thereon away from the sensing means toward the cut-off station, feed control means operatively connected to the feeding devices for separately effecting continuous feeding of each tape in response to said limited movement thereof until a mark thereon is spaced said predetermined distance from the cut-off station, and cutter control means operatively connected to said cutter blade and the feed control means for preventing severing of the tapes until feeding of all of the tapes has stopped.

14. The combination of claim 13 wherein each of said marking devices includes, a selectively actuated tape puncturing element having a beveled portion for puncturing an aperture in a tape with a folded flap on one edge thereof to thereby physically mark the tape, said sensing means including, a feeler element projected through said aperture and displaced out of the aperture by the folded flap when said limited movement of the tape is effected, said feeler element being operatively connected by said feed control means to one of said feeding devices for energization therof when the feeler element is out of the aperture in the tape.

15. The combination of claim 14 wherein said cutter control means comprises, blade actuating means and means operatively connecting the blade actuating means to all of the feeding devices for holding the cutter blade retracted as long as any one of the feeding devices is energized.

16. The combination of claim 13 wherein said cutter control means comprises, blade actuating means and means operatively connecting the blade actuating means to all of the feeding devices for holding the cutter blade retracted as long as any one of the feeding devices is energized.

References Cited in the file of this patent

UNITED STATES PATENTS

| | | |
|---|---|---|
| 2,652,864 | DeAnguera | Sept. 22, 1953 |
| 2,728,392 | Marsh | Dec. 27, 1955 |
| 2,937,554 | Nathan | May 24, 1960 |

FOREIGN PATENTS

| | | |
|---|---|---|
| 409,749 | Germany | Feb. 10, 1925 |